(No Model.)
J. FEY.
APPARATUS FOR PICKLING MEAT.
No. 474,446. Patented May 10, 1892.
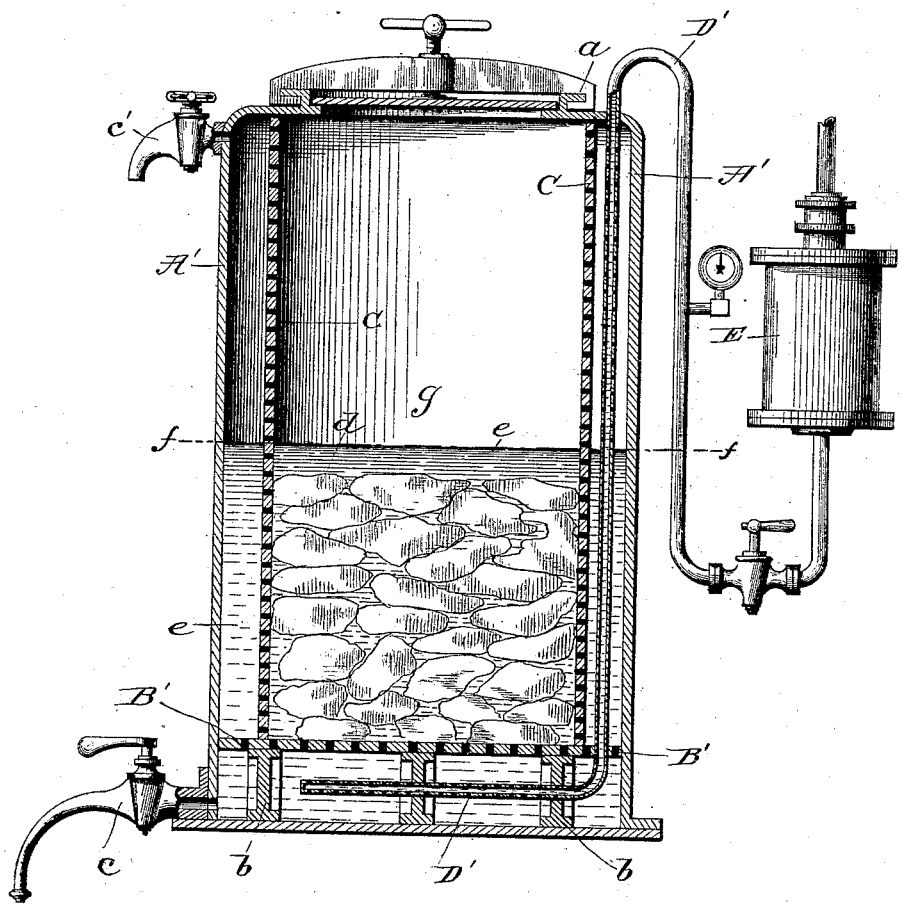
Witnesses
Inventor
Johann Fey
his Attorney

UNITED STATES PATENT OFFICE.

JOHANN FEY, OF OFFENBACH-ON-THE-MAIN, GERMANY.

APPARATUS FOR PICKLING MEAT.

SPECIFICATION forming part of Letters Patent No. 474,446, dated May 10, 1892.

Application filed December 16, 1890. Serial No. 374,949. (No model.)

*To all whom it may concern:*

Be it known that I, JOHANN FEY, locksmith, of Offenbach-on-the-Main, in the Grand Duchy of Hesse-Darmstadt and German Empire, have invented a new and useful Apparatus for Pickling Meats, Fishes, &c., of which the following is a specification, reference being had therein to the accompanying drawing.

This invention consists mainly in the application of compressed air by means of a pressure-pump to the pickle or brine used in pickling or salting, the said pickle being thereby driven forcibly into the meat, and thereby effecting the operation of pickling in a much shorter time than has hitherto been the case. It provides, also, the great advantage of a more perfect penetration of the pickle into the meat.

The invention is illustrated in the accompanying drawing.

The apparatus for pickling meat, fish, and such like is arranged in such a manner that the meat is placed in a receptacle which is perforated in all parts. The brine $e$ being poured over it sufficiently to cover it, compressed air is then made to bubble up from the bottom through the liquor, causing a continuous rising and falling of the meat in the brine and keeping it suspended in the liquid and presenting the whole of the surface to its action. The brine is, moreover, kept in motion by the compressed air passing through it, and by this means the stronger portion at the bottom is forced upward, so that during the whole of the time of pickling the brine is of the same strength, and causing, moreover, a continuous action of the air and the brine on the meat and a consequent uniform penetration.

In the vessel A', which is hermetically closed by means of the lid $a$, a perforated disk B', resting on supports $b$, is arranged. A little above the bottom of the vessel a tap $c$ is fixed, and entering the upper part of the vessel there is a pipe D', reaching almost to the bottom, which is bent and carried under the disk B'. The lower part of this pipe D' is also perforated. Outside the vessel A' the tube is in connection with an air-pump E or other suitable compressed-air supply.

When using the apparatus, the meat is placed on the perforated disk B'. Then the brine is run in until the meat is quite covered with it and the level reaches to about the line $ff$. The lid $a$ is then closed hermetically and the air-pump is set in motion. The compressed air passes through the holes in the pipe D' underneath the perforated disk B' and through the brine into the open space $g$. The air passing through the brine sets the meat in motion, so that every piece is acted upon on the whole of its surface by brine of uniform strength, while the air over the brine-level acts from above and from the sides, forcing the brine into the meat. The meat becomes thoroughly and uniformly impregnated in a very short time and possesses an equal flavor. As soon as the process is ended the brine is let off at the tap $c$ and the pickled meat removed. The perforated disk B' not only serves to send the air-pressure evenly through the brine, but also to free the meat as much as possible of the brine when drawing off the liquor. Holes can also be provided in the part of the pipe D' passing through the space $g$ to facilitate the outflow of compressed air. By letting off the compressed air through a tap $c'$ at the upper part of the vessel and by reintroducing fresh compressed air the pressure can be repeated at pleasure. The tap $c'$ also serves to remove the compressed air before taking out the pickled meat. When compressed air can be obtained from a central air source or main, the cheapness of such supply becomes a material feature in the carrying out of this invention.

The pumping apparatus can be so modified that it can be used to pump air or brine into the apparatus. The pickling can also be effected by placing a number of apparatus in series, one over the other, forming a pickling arrangement for different sorts of meats within a small area, which is desirable where economy of space is a consideration.

What I claim, and desire to secure by Letters Patent of the United States, is—

The preserving apparatus for meats, &c., comprising the outer imperforate casing or cylinder having the removable cover adapted to be hermetically closed, the inner perforated cylinder whose perforated bottom is supported elevated above the bottom of the outer inclosing cylinder, and the air-inlet pipe having connection with air-supply devices and having a perforated vertical portion and a perforated horizontal portion, said perforated vertical portion arranged along the side of and within the outer cylinder and said perforated horizontal portion being arranged below the perforated bottom of said inner cylinder, substantially as described.

Offenbach, the 29th day of October, 1890.

JOHANN FEY.

Witnesses:
 FRANK H. MASON,
 EDUARD ZOLL.